(12) United States Patent
Liukku et al.

(10) Patent No.: US 10,281,486 B2
(45) Date of Patent: May 7, 2019

(54) MICROELECTROMECHANICAL ACCELEROMETER DEVICE

(71) Applicant: MURATA MANUFACTURING CO., LTD., Nagaokakyo-shi, Kyoto (JP)

(72) Inventors: Matti Liukku, Helsinki (FI); Severi Niskanen, Espoo (FI)

(73) Assignee: MURATA MANUFACTURING CO., LTD., Nagaokakyo-Shi, Kyoto (JP)

( * ) Notice: Subject to any disclaimer, the term of this patent is extended or adjusted under 35 U.S.C. 154(b) by 220 days.

(21) Appl. No.: 15/275,640

(22) Filed: Sep. 26, 2016

(65) Prior Publication Data

US 2017/0089946 A1    Mar. 30, 2017

(30) Foreign Application Priority Data

Sep. 25, 2015 (FI) .................................... 20155684

(51) Int. Cl.
*G01P 15/18* (2013.01)
*G01P 15/125* (2006.01)
*G01P 15/08* (2006.01)

(52) U.S. Cl.
CPC ............ *G01P 15/125* (2013.01); *G01P 15/18* (2013.01); *G01P 2015/0811* (2013.01); *G01P 2015/0848* (2013.01)

(58) Field of Classification Search
CPC ........... G01P 15/125; G01P 15/18; B81B 5/00
USPC ...................................................... 73/514.32
See application file for complete search history.

(56) References Cited

U.S. PATENT DOCUMENTS

| 6,981,416 B2 * | 1/2006 | Chen ..................... G01P 15/125 73/510 |
| 2005/0166675 A1 | 8/2005 | Hobbs et al. |
| 2007/0119252 A1 * | 5/2007 | Adams ................ G01P 15/0802 73/510 |

(Continued)

FOREIGN PATENT DOCUMENTS

| DE | 10 2010 043 980 A1 | 9/2011 |
| WO | 2008/074538 A1 | 6/2008 |

(Continued)

OTHER PUBLICATIONS

International Search Report international application No. PCT/IB2016/001356 dated Dec. 9, 2016.

(Continued)

*Primary Examiner* — John Fitzgerald
*Assistant Examiner* — Jean F Morello
(74) *Attorney, Agent, or Firm* — Squire Patton Boggs (US) LLP

(57) ABSTRACT

The structure enables two-directional sensing of accelerations with compact component dimensions and with minimal cross-axis sensitivity. The rotation mass includes a first frame and a second frame. In one sense direction, the structure employs a combined proof mass of the first frame and the second frame, which improves the signal to noise level achievable with said device dimensions. In the other sense direction, a detection structure with at least two sensing elements is used to detect displacements of the proof mass of the second frame. Due to the specific internal configuration of the detection structure, signal contributions of the sensing elements in the one direction cancel each other.

16 Claims, 8 Drawing Sheets

(56) References Cited

U.S. PATENT DOCUMENTS

| | | | |
|---|---|---|---|
| 2010/0122579 A1* | 5/2010 | Hsu | G01P 15/125 |
| | | | 73/514.32 |
| 2011/0023606 A1 | 2/2011 | Burghardt et al. | |
| 2014/0345380 A1* | 11/2014 | Jia | B81B 3/0016 |
| | | | 73/514.32 |
| 2015/0000403 A1 | 1/2015 | Liukku et al. | |

FOREIGN PATENT DOCUMENTS

| | | |
|---|---|---|
| WO | WO 2008/074538 A1 | 6/2008 |
| WO | WO 2013/104827 A1 | 7/2013 |
| WO | WO 2014/0207710 A1 | 12/2014 |

OTHER PUBLICATIONS

Finnish Search Report dated Mar. 24, 2016 corresponding to Finnish Patent Application No. 20155684.
Jason W. Weigold et al: "Design and Fabrication of Submicrometer, Single Crystal Si Accelerometer," Journal of Microelectromechanical Systems, vol. 10, No. 14, Dec. 2001, pp. 518-524.

\* cited by examiner

MICROELECTROMECHANICAL ACCELEROMETER DEVICE

BACKGROUND

The present invention relates to microelectromechanical systems and especially to a microelectromechanical structure for measuring accelerations and a microelectromechanical accelerometer device.

DESCRIPTION OF THE RELATED ART

Microelectromechanical structures can be applied to quickly and accurately detect changes in physical properties. An example of such detection is measurement of acceleration experienced by an object. Accelerometers can also be used as inclinometers to measure the component of earth's gravity in a measuring direction.

The principle of acceleration sensing is simple and reliable: inertia of a moving body is converted into force according to Newton's second law. The basic elements of the accelerometer are the spring, the proof mass and the surrounding support structures. The spring connects the mass to the support. When the speed of the sensor changes, the proof mass is forced to follow the change via the spring coupling. A force is needed to change the motion of the proof mass. Due to this force the spring deflects and the distance between the support and the proof mass changes in proportion to the acceleration.

In a capacitive sensor the support and the proof mass are insulated from each other, and their capacitance, or charge storage capacity, is measured. As the distance decreases, the capacitance increases; when the distance increases, the opposite occurs. The sensor converts the acceleration of the body into an electric current, charge or voltage.

Deflection of the spring is typically arranged to be directional such that the spring responds to displacements of the proof mass along one direction, i.e. along a sense axis, with stiffness of a selected spring constant, and eliminates displacements of the proof mass in other directions. Depending on the needs of the application, an accelerometer device can be designed for a specific sensitivity, measuring range and frequency response. Accelerometer devices can also be adapted for sensing in two or more directions, i.e. to multi-axis sensing with a combination of separate proof masses that have different sense axes. In an attempt to reduce dimensions of the accelerometer device, it is also possible to use more complex proof mass structures that include a part or parts with more than one degree of freedom, and thereby enable detection of displacements in more than one sense axis directions.

Typically multi-axis sensors with a proof mass structure for more than one degrees of freedom include a combination of parts that are nested in a plane and mechanically coupled to each other with directional spring structures. However, the spring structures tend to allow perpendicular acceleration to the sensed motion, and thereby increase cross axis error of such acceleration sensor devices.

The dimensions of the inertial proof mass are important because they typically determine the range of sensitivity of the detection. Different types of acceleration sensors have different requirements, and a specific challenge is detection of acceleration in different ranges. Sensing of lower accelerations (low-g accelerometers) requires a large proof mass, whereas in higher accelerations (high-g accelerometers) a detectable motion may be achieved with a smaller proof mass. Combining requirements for high-g and low-g accelerometers in a compact structure is very demanding.

SUMMARY

The present invention disclose a novel compact microelectromechanical structure that enables detection of accelerations in two in-plane directions with reduced cross-axis sensitivity.

Embodiments of the invention include a microelectromechanical accelerometer structure, and a microelectromechanical accelerometer as defined in the appended claims.

Further advantages achievable with the invention are discussed in more detail with the further embodiments disclosed in the dependent claims and in the following detailed description.

BRIEF DESCRIPTION OF THE DRAWINGS

In the following the invention will be described in greater detail, in connection with preferred embodiments, with reference to the attached drawings, in which.

DETAILED DESCRIPTION

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a device architecture in which various embodiments of the invention may be implemented. Only elements relevant for illustrating the embodiments are described in detail. Various implementations of microelectromechanical devices that are generally known to a person skilled in the art may not be specifically described herein.

Figure 1:
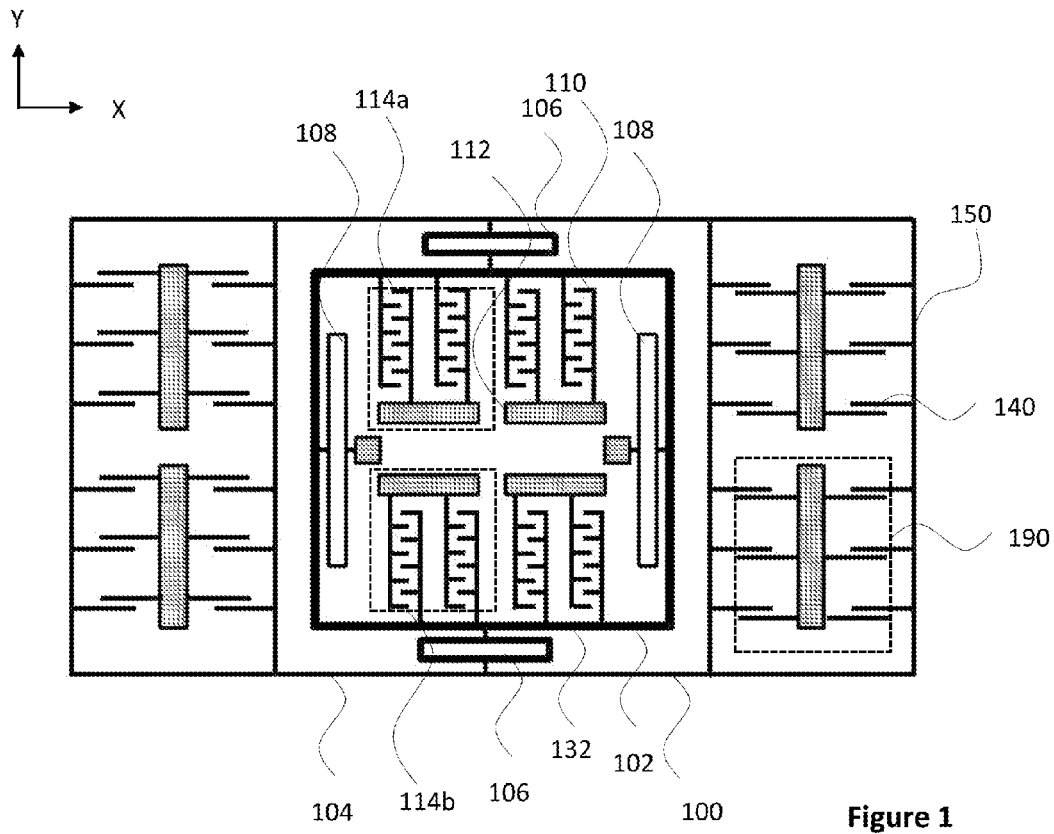
FIG. 1 illustrates basic elements of a microelectromechanical structure applicable in a microelectromechanical system (MEMS) accelerometer device.

FIG. 1 illustrates basic elements of a microelectromechanical structure applicable in a microelectromechanical system (MEMS) accelerometer device. FIG. 1 shows a top view to a part of a planar structure layer forming the microelectromechanical structure of a MEMS accelerometer device. The planar structure layer may be manufactured by patterning or etching structures on or into a substrate wafer, a silicon-on-insulator wafer or a cavity-silicon-on-insulator wafer. Manufacturing methods of MEMS devices are well known to a person skilled in the art and will not be elaborated here in more detail. Directions that are parallel to the plane of the planar structure are referred to as in-plane directions and directions perpendicular to the plane of the planar structure are referred to as out-of-plane directions.

The planar structure layer may include parts that are anchored to a support plane provided by another structure layer of the MEMS accelerometer device such that the anchored parts move rigidly with movements of the MEMS accelerometer device. The planar structure layer may include also suspended parts that are flexibly supported to the MEMS accelerometer device, for example, to another structure layer of the MEMS accelerometer device, and may therefore move in respect to the anchored parts according to forces acting upon the MEMS accelerometer device. The mutual positioning between the anchored and suspended parts of the structure layer may be used to sense position, velocity or acceleration of the MEMS accelerometer device.

In FIG. 1 anchored parts of the structure show as patterned areas that can be considered to be rigidly coupled to a support plane (not shown). The support plane may be provided, for example, by a handle wafer of a silicon-on-insulator wafer, or a cap wafer over the planar structure layer. FIG. 1 also shows a rotor mass 100 that includes a first frame 102, a second frame 104 and a coupling spring structure 106 that couples the first frame 102 and the second frame 104 to each other.

In an initial state when no additional external forces act on the MEMS accelerometer device, the first frame 102 is suspended into a neutral position from a planar support structure by means of a first spring structure 108. The first spring structure 108 may be a directional flexible mechanism that deforms according to displacements of the first frame from the neutral position. The first spring structure 108 may respond to displacements of the first frame 102 from the neutral position along a selected first direction with stiffness of a first spring constant, and by far eliminate displacements of the first frame along directions other than the first direction. In the exemplary structure of FIG. 1, the selected first direction is called a horizontal in-plane direction and denoted in the drawings with X. The first spring structure 108 thus provides the first frame 102 with one degree of freedom in respect of the support plane.

The second spring structure 106 that couples the first frame 102 and the second frame 104 to each other is also a flexible mechanism. The second spring structure 106 suspends the second frame 104 into a neutral position from the first frame 102, and may deform according to displacements of the second frame from this neutral position. Furthermore, the second spring structure 106 is also directional such that it responds to displacements of the second frame 104 from its neutral position along a second direction with stiffness of a second spring constant, and by far eliminates displacements of the second frame 104 along directions other than the second direction. In the exemplary structure of FIG. 1, the selected second direction is called a vertical in-plane direction and denoted in the Figures with Y. The vertical in-plane direction is orthogonal to the horizontal in-plane direction X. It is noted that the terms vertical and horizontal are used here for simple referencing to the attached drawings. Within the scope, any two orthogonal in-plane directions are applicable as the first direction and the second direction.

Accordingly, as a result of the combination of the first spring structure, the first frame, the second spring structure and the second frame, the first frame 102 has one degree of freedom in a horizontal in-plane direction X. The second frame 104 that is rigidly coupled to the first frame in the horizontal direction moves along the horizontal displacements of the first frame 102. On the other hand, the first spring structure 108 efficiently eliminates displacements of the first frame 102 along the vertical direction Y, while the second spring structure 106 allows the second frame 104 to be displaced along the vertical direction Y. The second frame thus has two orthogonal in-plane degrees of freedom in respect of the support. This means that the inertial proof mass for detection in the horizontal direction includes both the mass of the first frame and the second frame.

In the following, to distinguish functional elements of the structure, the term 'primary' is used to relate to detection of displacements in the direction where larger proof mass is applied and the term 'secondary' is used to relate to detection of displacements in the direction where smaller proof mass is applied without, however, indicating any rank, importance of preference to either of the directions, as such. The structure of FIG. 1 is also shown to include a primary detection structure 110 for detection of motion of the first frame 102 in the horizontal direction. The detection may be based on detecting variations in capacitance. In a parallel plate capacitor, capacitance is proportional to the area of overlap and inversely proportional to the separation between two capacitor plates. Parallel plate capacitors can be used to create closing gap structures, or area modulated structures, or a hybrid of them.

In closing gap structures, capacitor plates move towards and away from each other. Typically one of the plates is stationary, and the other plate moves closer to and further away from the other plate. The capacitance behavior can then be approximately modeled with equation (1)

$$C = \epsilon \frac{A}{d-x} + C_f \quad (1)$$

where C is the capacitance, ε is permittivity, A a constant overlap area between the plates, d an initial gap between the plates, x a displacement from the initial gap position, and $C_f$ a static stray capacitance.

In area modulated structures, the plates move parallel to each other and capacitance behavior can be modeled with equation (2)

$$C = \epsilon \frac{h(l+x)}{d} + C_f \quad (2)$$

where d is a constant gap between the plates, h a constant overlap dimension (height) of the plates, l an initial overlap length, x a displacement from the initial overlap length, and $C_f$ a static stray capacitance.

Figure 2:
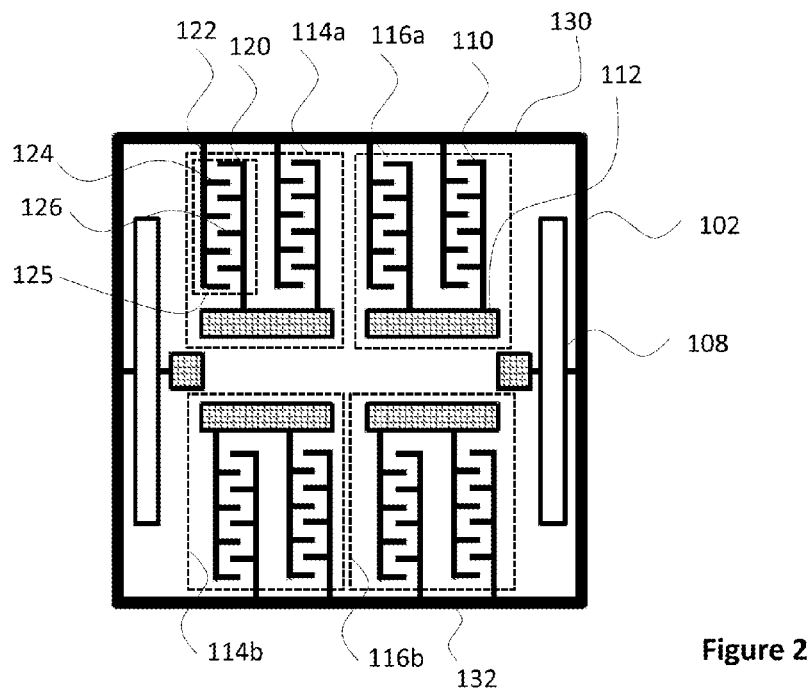
FIG. 2 illustrates a partial section from the planar structure layer of FIG. 1.

FIG. 2 illustrates a partial section from the planar structure layer of FIG. 1. The section includes the first frame 102, the first spring structure 108 and a primary detection structure 110 for detecting displacements of the rotor mass 100 along the first direction. In the structure of FIG. 1, the first direction is the horizontal direction and horizontal displacements of the rotor mass 100 are detected from displacements of the first frame 102 from its neutral position in respect of the support structure. As shown in FIG. 2, the primary detection structure 110 may include a primary detection element 114a that includes a set of one or more primary stator combs 120 capacitively coupled to a set of one or more primary rotor combs 122.

In general, in displacement measurements, a detection element can be considered to output a capacitive signal at the same frequency as the input acceleration. An external observed acceleration signal is first converted to force with gain that is equal to the movable inertial mass of the sensor component, and the force domain signal transforms into displacement of the inertial mass. The inertial mass forms a capacitor with a static reference element insulated from it, such that input acceleration brings forth a shift in the capacitance of the detection element. The varying capacitance of the capacitor is detected by an electronic readout circuit that first uses ac voltage to convert the capacitance into a charge that may be converted into an easily accessible format like voltage or a digital word by a front-end electronics. The term capacitive coupled thus refers here to an arrangement where a static element and a movable element are connected to a readout circuitry capable of transforming the capacitance between the static element and the movable element into a different electrical quantity, for example charge, a voltage or a digital word. For example, capacitive coupling of the set of one or more primary stator combs 120 to the set of one or more primary rotor combs 122 means that the set of primary stator combs 120 is electrically insulated from the set of primary rotor combs 122, and the sensor device includes a readout circuitry capable of transforming the capacitance between the set of primary stator combs 120 and the set of primary rotor combs 122 into another electrical quantity. Within the scope, a variety of open-loop and closed-loop readout circuit configurations may be applied in a readout circuit. Such configurations are well known to a person skilled in the art, and will not be discussed herein in more detail.

The primary stator combs 120 may be rigidly coupled to the anchored elements 112, and the primary rotor combs 122 may be rigidly coupled to the first frame 102. The fingers 126 of the primary stator combs 120 and the fingers 124 of the primary rotor combs 122 may extend along the horizontal direction in an interdigitating manner such that one primary stator comb and one primary rotor comb become paired to form one primary sensing element 125. In such primary sensing element 125, a vertically neighboring comb finger for a primary stator comb finger is a primary rotor comb finger, and a vertically neighboring comb finger for a primary rotor comb finger is a primary stator comb finger. Accordingly, when the first frame 102 moves along the horizontal direction, the overlap of the primary stator and rotor comb fingers, and thereby capacitance between the primary stator comb 120 and the primary rotor comb 122 of a primary sensing element increases and decreases. The output signal of one primary detection element 114a is the sum of the signals of the primary sensing elements 125 in it, i.e. the sum of capacitances between paired stator combs and rotor combs of said primary detection element 114a.

At minimum, at least one primary detection element 114a is needed for the detection of displacements of the first frame. In the exemplary arrangement of FIG. 1, the primary detection structure 110 is further arranged to provide a differential signal that cancels out common source errors caused e.g. by potential deformations in the support structures. For this, the primary detection structure may include at least one pair of primary detection elements 114a, 114b, both of which are arranged to contribute to the output detection signal of the primary detection structure 110. Each primary detection element 114a, 114b may include one or more primary sensing elements, wherein primary sensing elements 125 are formed of one or more pairs of primary stator combs 120 and primary rotor combs 122, as discussed above. As an example, in the illustrative structure of FIG. 2, each of the primary detection elements 114a, 114b is shown to include two primary sensing elements. The pair of primary detection elements 114a, 114b may be positioned in respect of the first frame 102 in such a manner that a displacement of the first frame 102 in the positive horizontal direction simultaneously increases capacitance of one primary detection element 114a, and decreases capacitance of the other primary detection element 114b of the pair of primary detection elements. A differential output signal sx of the primary detection structure 110 generated in response to displacements of the first frame along the horizontal direction may be derived from:

$$sx=s(114a)-s(114b)$$

whereby any potential common error shift in the capacitances of primary detection elements 114a, 114b is cancelled out.

For increased signal levels and accuracy, capacities of more than one pair of primary detection elements may be applied in the differential detection scheme. In the exemplary arrangement of FIG. 1, the first frame 102 is rectangular, but other forms may be applied within the scope. As shown in more detail in FIG. 2, for increased signal levels, one side (denoted here as a first side 130) of the first frame 102 may include at least two primary detection elements 114a, 116a, and a second side 132 in the opposite side of the first frame in the vertical direction may include another two primary detection elements 114b, 116b.

As an example, the two primary detection elements 114a, 116a in the first side 130 may be coupled to form detection element pairs with the other two primary detection elements 114b, 116b in the second side 132, respectively, such that when the first frame 102 moves in the positive horizontal direction +X, capacitance of the primary detection elements 114a, 116a in the first side 130 increases and capacitance of the primary detection elements 114b, 116b in the second side 132 decreases. Correspondingly, when the first frame 102 moves in the negative horizontal direction −X, capacitance of the primary detection elements 114a, 116a in the first side 130 decreases and capacitance of the primary detection elements 114b, 116b in the second side 132 increases. A differential output signal sx of the primary detection structure 110 generated in response to displacements of the first frame along the horizontal direction may thus be derived as $$sx=[s(114a)+s(116a)]-[s(114b)+s(116b)]$$

In this kind of differential detection, errors caused, for example, by temperature-related deformations in the structural layers become eliminated and a signal that more accurately represents true displacements of the first frame 102 is generated.

It is noted that the differential arrangement of FIG. 1 is exemplary only. Other differential orientations of the primary detection elements may be applied within the scope. Furthermore, comb structures and differential detection are not essential features of the primary detection structure, other detection methods applicable for detecting displacements of the first frame 102 from its neutral position along the horizontal direction may also be applied within the scope.

As shown in FIG. 1, the microelectromechanical structure includes also a secondary detection structure 140 for detection of motions of the rotor mass 100 along the second direction. In the embodiment of FIG. 1, the second direction is denoted as the vertical direction. Since the directional first spring structure 108 eliminates vertical motions of the first frame 102, vertical motions of the rotor mass 100 are detected from vertical displacements of the second frame 104. Since the second frame 104 has two degrees of freedom, a signal of the secondary detection structure 140 includes a first signal component Sx resulting from displacements of the second frame along the horizontal direction from its neutral position and a second signal component Sy resulting from displacements of the second frame along the vertical direction from its neutral position. As will be described in more detail, the secondary detection structure 140 may include at least one secondary detection element in which a pair of secondary sensing elements are positioned such that a displacement of the second frame along the first direction increases contribution of one secondary sensing element of the pair of secondary sensing elements to the first signal component, and decreases equally contribution of the other secondary sensing element of the pair of secondary sensing elements to the first signal component. This means that the contribution of the one secondary sensing element of the pair of secondary sensing elements to the first signal component, and the contribution of the other secondary sensing element of the pair of secondary sensing elements to the first signal component thereby cancel each other.

The secondary sensing elements may be implemented as secondary detection combs such that displacements of the second frame along the horizontal direction from its neutral position correspond to changes in overlap of the comb fingers in the secondary detection structure 140, and displacements of the second frame along the vertical direction from its neutral position correspond to changes in distance between the comb fingers in the secondary detection structure 140.

Figure 3A:
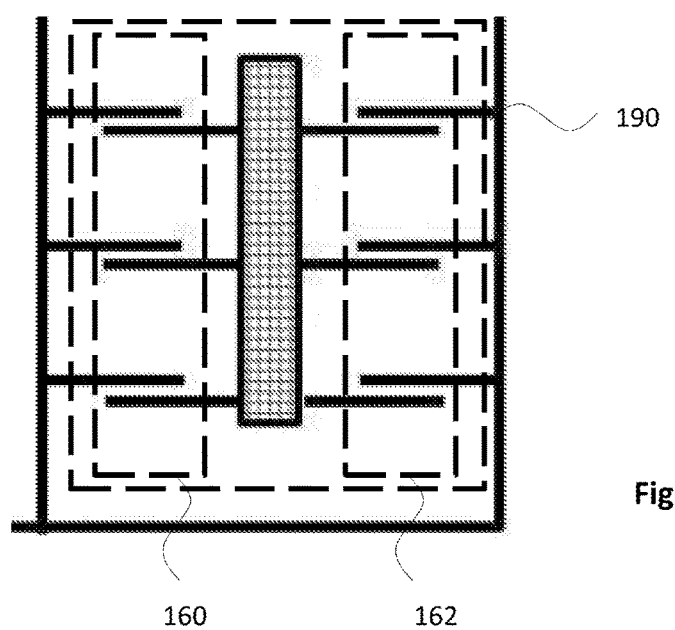
FIGS. 3A and 3B show in more detail references to the internal structure of the secondary detection element of FIG. 1.
Figure 3B:
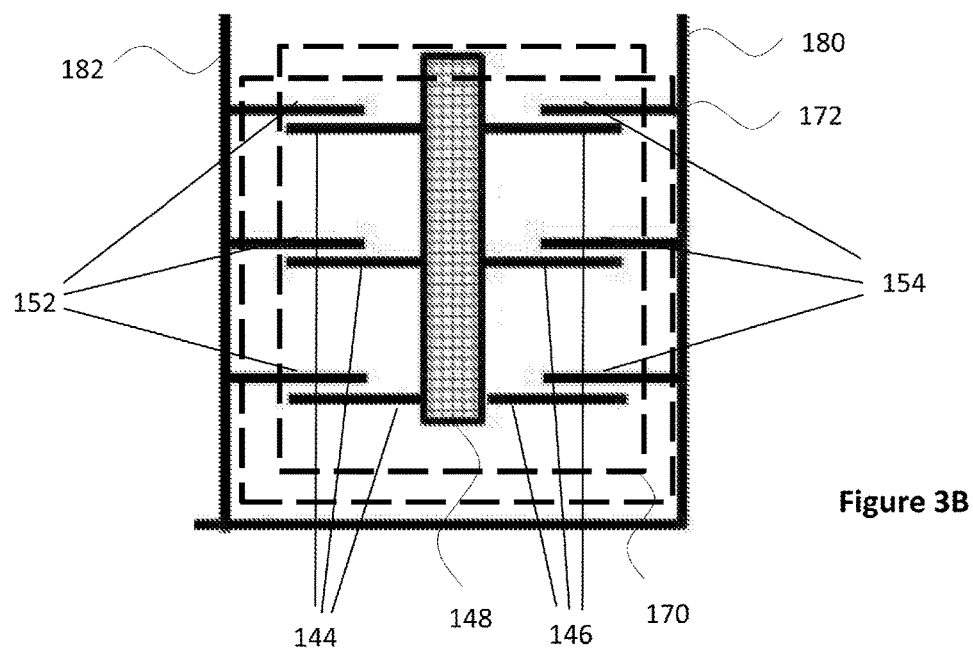

FIG. 1 shows an exemplary implementation of the secondary detection structure 140 that includes a secondary detection element 190. FIGS. 3A and 3B show in more detail references to the internal structure of the secondary detection element 190 of FIG. 1.

Accordingly, as shown in FIG. 3A, the secondary detection element 190 may include a pair of secondary sensing elements 160, 162 positioned such that a displacement of the second frame along the horizontal direction simultaneously increases contribution of one secondary sensing element 160 to the first signal component Sx, and equally decreases contribution of the other secondary sensing element 162 to the first signal component Sx. This means that even if the second frame 104 is coupled to move with displacements the first frame along the horizontal direction, the signal contributions of the secondary sensing elements 160, 162 to the first signal component Sx cancel each other (Sx=0), and the output signal S=Sx+Sy generated by one secondary detection element 190 varies only according to the displacements of the second frame along the vertical direction. The inertial proof mass for the displacements along the vertical direction includes the mass of the second frame, but the inertial proof mass for the displacements along the horizontal direction includes both the mass of the first frame and the mass of the second frame, which can be substantially more than the mass of the first frame alone.

In FIG. 3B, the arrangement is further detailed by the secondary detection element including an anchored secondary stator comb 170 with comb fingers extending in two opposite directions, and a secondary rotor comb 172 with comb fingers extending from the second frame towards the stator comb 170. More specifically, the secondary stator comb 170 includes a secondary stator comb body 148 that extends in the vertical direction, and two sets of secondary stator comb fingers 144, 146. A first set of secondary stator comb fingers 144 extends from the secondary stator comb body 148 in the negative horizontal direction and a second set of secondary stator comb fingers 146 extends from the stator comb body 148 in the opposite positive horizontal direction.

In FIG. 1, it is shown that the second frame 104 may circumscribe the first frame 102 and include a subframe 150. FIG. 3B shows that the secondary rotor comb 172 may be mechanically coupled to the subframe 150 such that comb fingers of the secondary rotor comb 172 move along the movements of the subframe 150, and thereby along the movements of the second frame 104. The subframe 150 may provide two vertical supports 180, 182 in opposite sides of the secondary stator comb 170 for a rigid mechanical coupling of the secondary rotor comb fingers of 152, 154 of the secondary rotor comb 172. In FIG. 3B this is illustrated by the secondary rotor comb 172 including two sets of secondary rotor comb fingers 152, 154 that extend inwards from the vertical support of the subframe 150. The first set of secondary rotor comb fingers 152 are interdigitated with the first set of secondary stator comb fingers 144, and the second set of secondary rotor comb fingers 154 are interdigitated with the second set of secondary stator comb fingers 146. The subframe 150 couples the sets of secondary rotor comb fingers 152, 154 rigidly into their mutual orientation such that the secondary rotor comb finger sets 152, 154 move similarly along displacements of the second frame 104. Accordingly, the first set of secondary rotor comb fingers 152 and the first set of secondary stator comb fingers 144 form a first secondary sensing element 160 of the secondary detection element 190, and the second set of secondary rotor comb fingers 154 and the second set of secondary stator comb fingers 146 form a second secondary sensing element 162 of the secondary detection element 190.

When the second frame 104 moves in the positive horizontal direction, the rigidly coupled first set of secondary rotor comb fingers 152 and the second set of secondary rotor comb fingers 154 move equally in the positive horizontal direction, whereby the overlap between the first set of secondary rotor comb fingers 152 and the first set of secondary stator comb fingers 144 increases. Simultaneously, the overlap between the comb fingers of the second set of secondary rotor comb fingers 154 and the second set of secondary stator comb fingers 146 decreases to a similar extent. The signal portion generated by displacement of the second frame along the horizontal direction corresponds to the sum of overlaps of the comb fingers in the first secondary sensing element 160, and the sum of overlaps of the comb fingers in the second secondary sensing element 162. Due to the equal increase and decrease, the overlaps thus cancel each other and the detection of the secondary detection structure is insensitive to the horizontal displacements of the second frame 104. The output signal of the secondary detection element 190 corresponds merely to a variation of gaps between comb fingers of the first secondary sensing element 160, and the second secondary sensing element 162.

Due to the specific arrangement of the elements, the structure is able to detect motion of the microelectromechanical accelerometer device along the horizontal and vertical directions, but in the horizontal direction the sensing applies the combined inertial mass of the first and the second frames. The structure thus enables two-directional sensing with compact component dimensions and with minimal cross-axis sensitivity. In one of the sense directions, the structure employs a combined proof mass, which improves the signal to noise level achievable with said accelerometer device dimensions.

Figure 4:
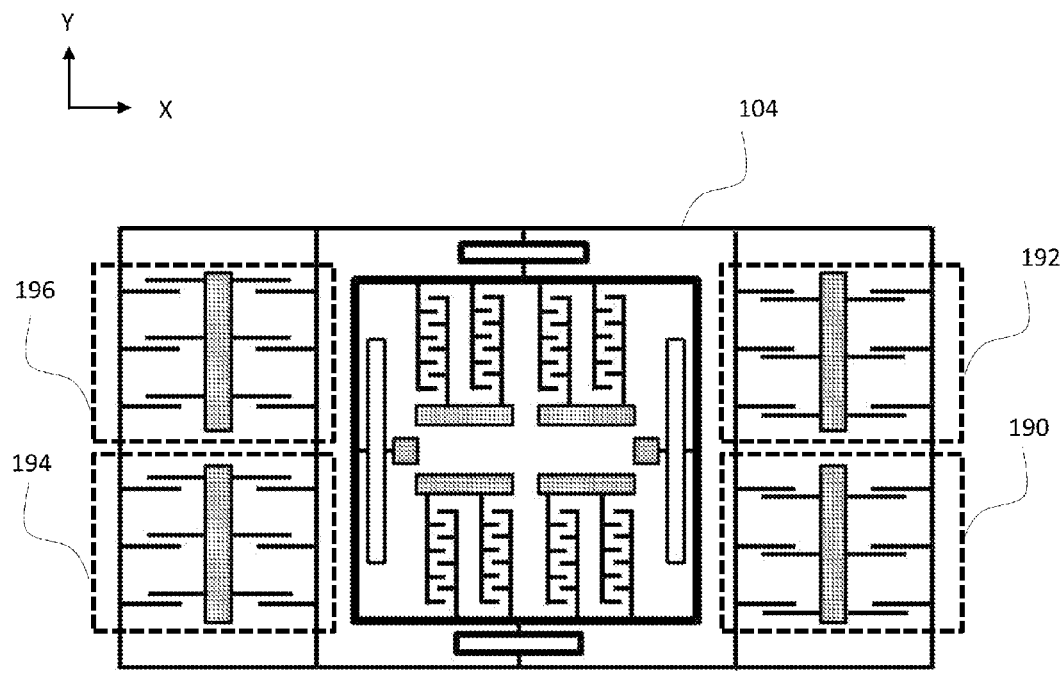
FIG. 4 illustrates a combination of detection elements of the MEMS accelerometer device of FIG. 1.

At minimum, the secondary detection structure 140 may include one secondary detection element 190 with one pair of sense elements 160, 162 that reversely respond to the horizontal displacements of the second frame. However, to cancel out offset caused by sources of common error, differential detection schemes may also be effectively applied in the described structure. In differential detection schemes, the total output signal of the secondary detection structure may be processed from signals of separate secondary detection elements 190. FIG. 4 shows the planar layer structure of FIG. 1 with dashed boxes that illustrate a combination of secondary detection elements 190, 192, 194, 196 that may be used for differential detection in the secondary detection structure 140 of the MEMS accelerometer device.

In the example structure of FIG. 4, a first secondary detection element 190 is a source of a first signal element s(190). A second secondary detection element 192 is on the same side of the first frame in the horizontal direction as the first secondary detection element 190, and is a source of a second signal element s(192). A third secondary detection element 194 is opposite to the first secondary detection element 190 in the horizontal direction, and is a source of a third signal element s(194). It is noted, that the expression 'A is opposite to B in the C direction' is used herein to express that object A is set to a position in relation to object B over the intervening first frame, the opposite sides of the first frame facing the positive and negative C directions. A fourth secondary detection element 196 is opposite to the second secondary detection element 192, is in the same side of the first frame in the horizontal direction with the third secondary detection element 194, and is a source of a fourth signal element s(194).

As described earlier, for its internal configuration, each secondary detection element 190, 192, 194, 196 of the secondary detection structure 140 generates a zero signal in response to the displacements of the second frame 104 in the horizontal direction. However, in the vertical direction, positioning of the secondary detection elements enables double differential detection. The configuration of FIG. 4 illustrates horizontally parallel double differential detection. This means that when the second frame 104 displaces in the positive vertical direction +Y, the distance between the comb fingers in the first secondary detection element 190 and the second secondary detection element 192 increases, and the distance between the comb fingers in the third secondary detection element 194 and in the fourth secondary detection element 196 decreases. Correspondingly, when the second frame 104 moves in the negative vertical direction −Y, the distance between the comb fingers in the first secondary detection element 190 and the second secondary detection element 192 decreases, and the distance between the comb fingers in the third secondary detection element 194 and in the fourth secondary detection element 196 increases. In order to cancel out sources of common error that has the same effect on these horizontally parallel secondary detection element pairs, it is possible to use a differential measurement scheme where secondary detection elements positioned on one side of the first frame and the other secondary detection elements positioned on the other side of the first frame are summed. The total output signal Sy may then be derived from:

$$Sy=[s(194)+s(196)]-[s(190)+s(192)]$$

In an aspect, due to the specific design, the proposed configuration enables in a very compact manner combination of low-g detection to a higher-g detection within one structural layer element. As discussed earlier, the first spring structure 108 responds to displacements of the first frame 102 from its neutral position along a horizontal in-plane direction with stiffness of a first spring constant K1. The second spring structure 106 responds to displacements of the second frame 104 from its neutral position along a vertical direction with stiffness of a second spring constant K2. The range of detection along the horizontal direction and in the vertical direction can be adjusted by adjusting the spring constants K1 and K2. In an advantageous configuration, the inner first frame may be adjusted to apply the larger proof mass for low-g detection and the smaller proof mass of the outer second frame can be used for high-g detection. Accordingly, the first spring constant K1 may be adjusted to be considerably smaller than the second spring constant K2. The ratio between the first spring constant K1 and the second spring constant K2 is advantageously 1:50 or smaller, preferably 1:100 or smaller. However, other order alternatives are possible within the scope, as well. The first spring constant K1 may be higher than the second spring constant K2, or the spring constants K1 and K2 may be equal.

Figure 5:
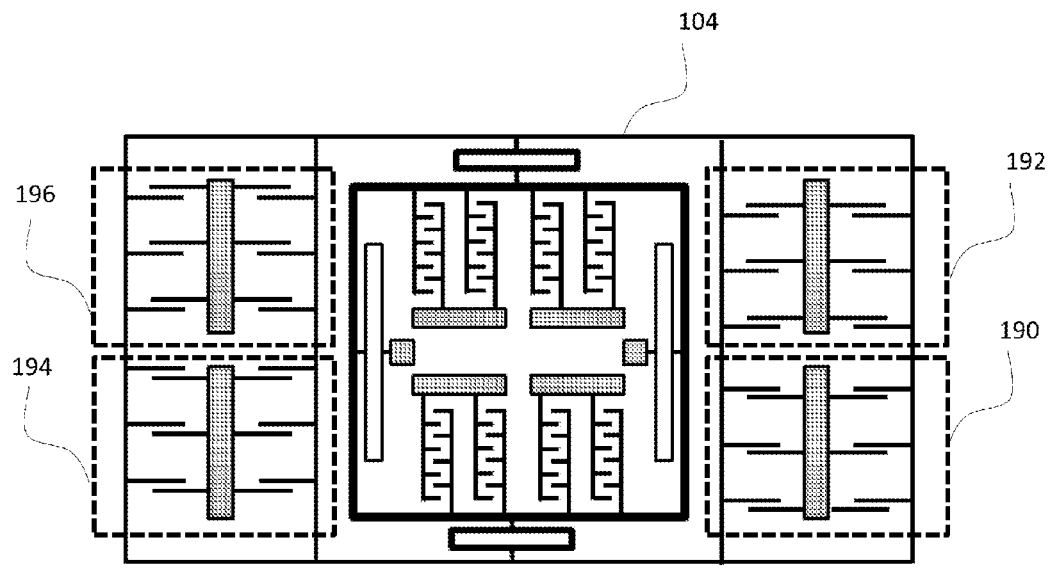
FIG. 5 illustrates an alternative configuration with different kind of signal source positions.

FIG. 5 illustrates an alternative configuration with different kind of signal source positions for vertically parallel double differential detection. In the configuration of FIG. 5, when the second frame 104 displaces in the positive vertical direction +Y, the distance between the comb fingers in the first secondary detection element 190 and the third secondary detection element 194 increases, and the distance between the comb fingers in the second secondary detection element 192 and in the fourth detection unit 196 decreases. Correspondingly, when the second frame 104 displaces in the negative vertical direction −Y, the distance between the comb fingers in the first secondary detection element 190 and the third secondary detection element 194 decreases, and the distance between the comb fingers in the second secondary detection element 192 and in the fourth secondary detection element 196 increases. In order to cancel out sources of common error that has the same effect on secondary detection element pairs that are parallel in the vertical direction, it is possible to use a differential measurement scheme where secondary detection elements positioned vertically parallel on opposite sides of the first frame are summed. The total output signal Sy may be derived from:

$$Sy=[s(190)+s(194)]-[s(192)+s(196)]$$

Figure 6:
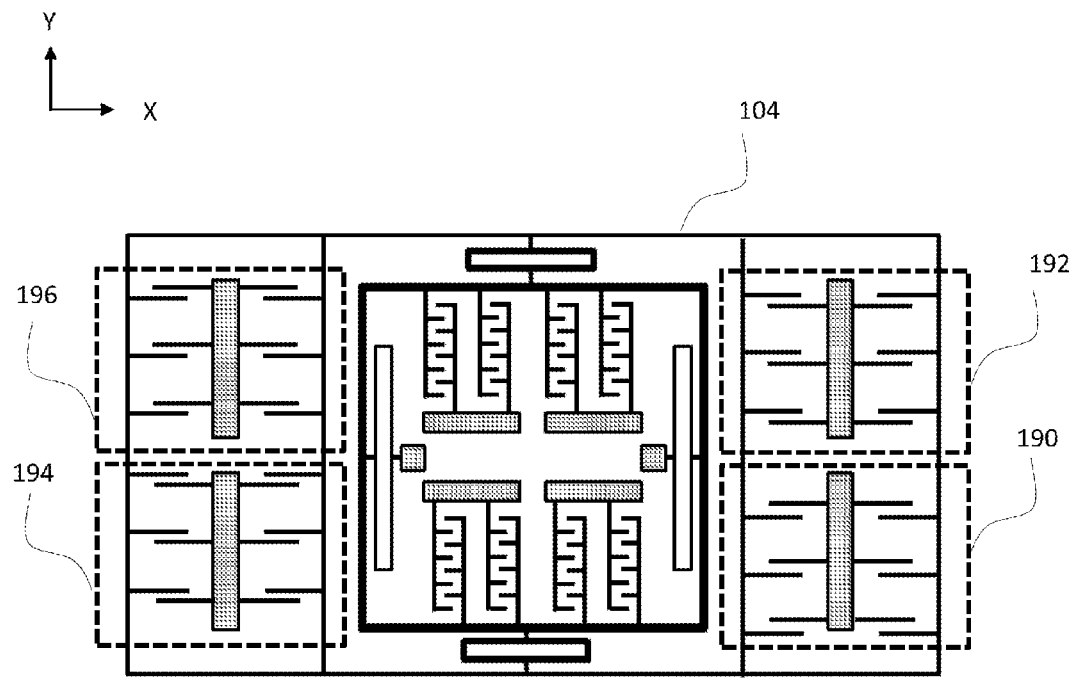
FIG. 6 illustrates a further alternative configuration with yet alternative signal source positions.

FIG. 6 illustrates a further alternative configuration with yet alternative signal source positions for cross-coupled double differential detection. In the configuration of FIG. 6, when the second frame 104 displaces in the positive vertical direction +Y, the distance between the comb fingers in the first secondary detection element 190 and the fourth detection unit 196 decreases, and the distance between the comb fingers in the second secondary detection element 192 and in the third secondary detection element 194 increases. Correspondingly, when the second frame 104 displaces in the negative vertical direction −Y, the distance between the comb fingers in the first secondary detection element 190 and the fourth secondary detection element 194 increases, and the distance between the comb fingers in the second secondary detection element 192 and in the third secondary detection element 194 decreases. In order to cancel out sources of common error that has the same effect on crosswise positioned secondary detection element pairs, it is possible to use a differential measurement scheme where secondary detection elements positioned cross-wise on opposite sides of the first frame are summed. The total output signal S may be derived from:

$$Sy=[s(190)+s(196)]-[s(192)+s(194)]$$

Figure 7:
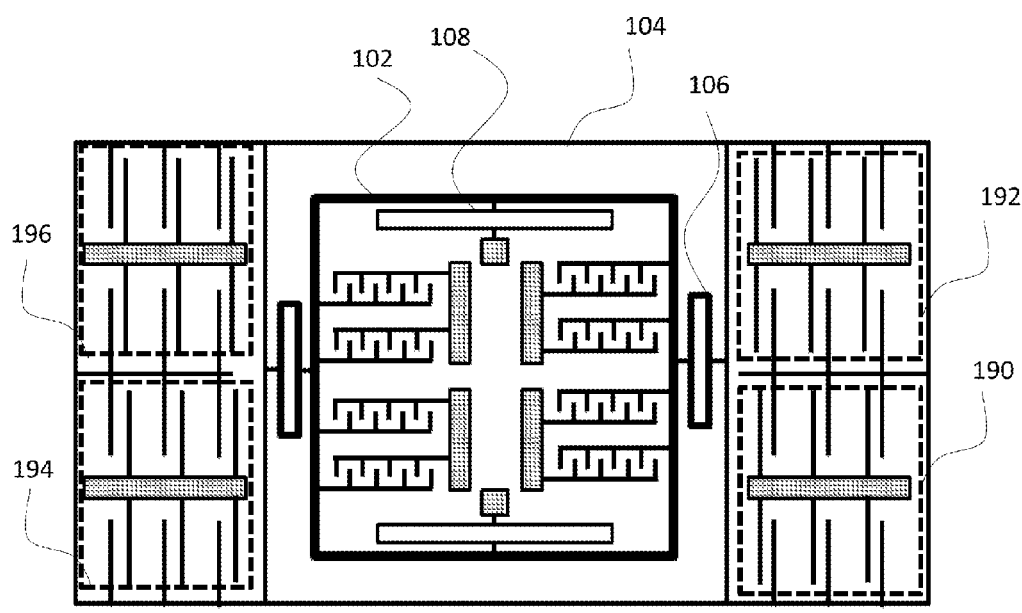
FIG. 7 illustrates a further alternative configuration with a different orientation of elements.

FIG. 7 illustrates a further alternative configuration with a different possible orientation of structural elements. In this embodiment, the first spring structure 108 suspends the first frame 102 into a neutral position in respect of the support and allows displacements from the neutral position in the vertical direction, and the second spring structure 106 suspends the second frame 104 into a neutral position in respect of the first frame 102, and allows displacements from the neutral position in the horizontal direction. The second frame 104 moves with displacements of the first frame 102, and the secondary detection elements 190, 192, 194, 196 of the secondary detection structure are oriented such that displacements of the second frame 104 in the vertical direction generate equal and automatically opposite signal components. As a result, the vertical direction signal components are eliminated from the signal resulting from the secondary detection structure.

When the second frame 104 displaces in the positive horizontal direction +X, the distance between the comb fingers in the first secondary detection element 190 and the second secondary detection element 192 increases, and the distance between the comb fingers in the third secondary detection element 194 and in the fourth secondary detection element 196 decreases. Correspondingly, when the second frame 104 displaces in the negative horizontal direction −X, the distance between the comb fingers in the first secondary detection element 190 and the second secondary detection element 192 decreases, and the distance between the comb fingers in the third secondary detection element 194 and in the fourth secondary detection element 196 increases. For differential detection, the total output signal Sx may be derived from:

$$Sx=[s(190)+s(192)]-[s(194)+s(196)]$$

Figure 8:
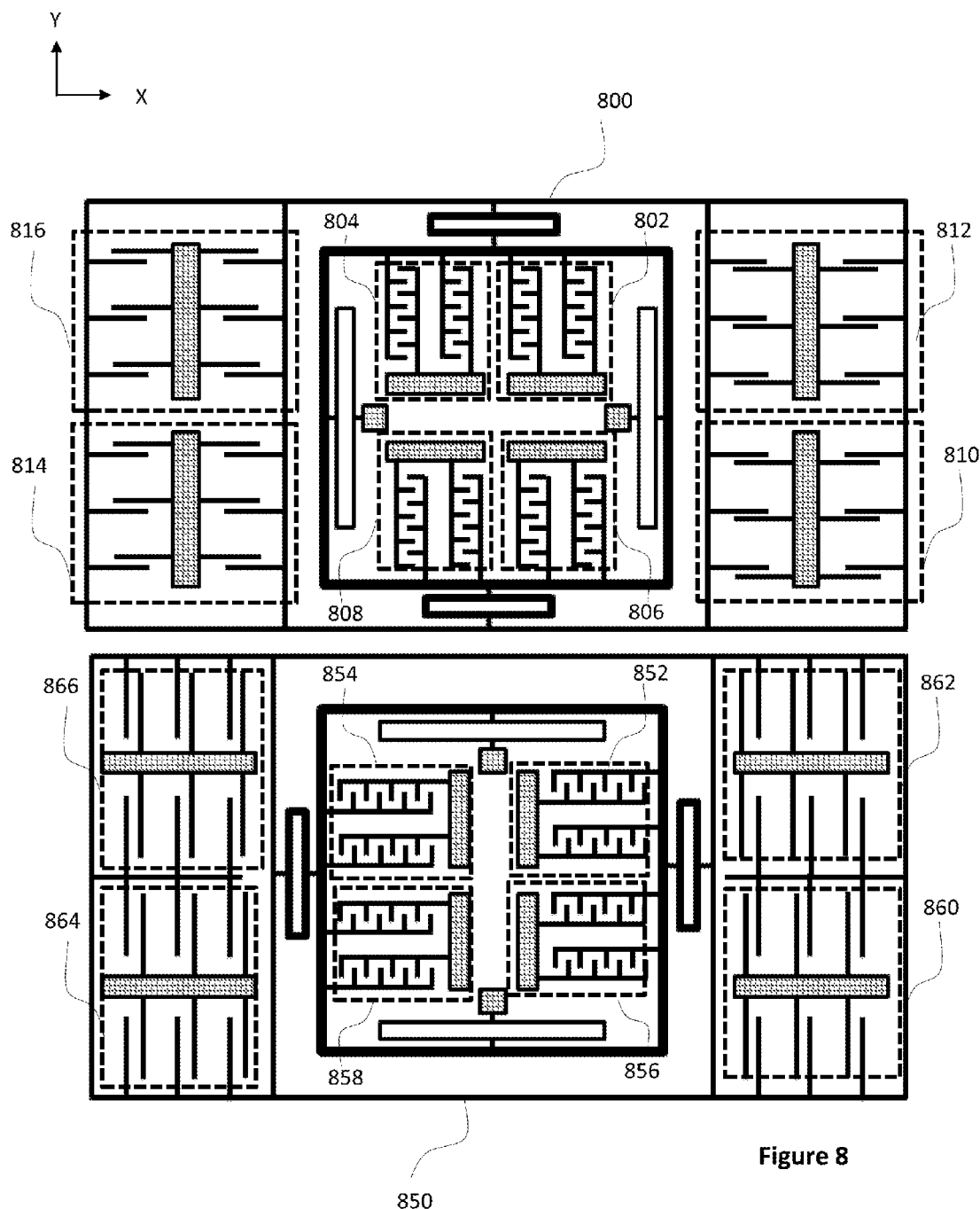
FIG. 8 illustrates an embodiment for double differential detection in the horizontal direction and in the vertical direction.

FIG. 8 illustrates an embodiment applicable for double differential detection, both in the horizontal direction and in the vertical direction. As an example, a first structural part 800 may include the microelectromechanical structure of FIG. 4, and a second structural part 850 may include the microelectromechanical structure of FIG. 6. For differential detection, the total output signal sx in the horizontal direction, and the total output signal Sy in the vertical direction from the first structural part 800 may be derived from:

$$sx=[s(802)+s(804)]-[s(806)+s(808)]$$

$$Sy=[s(814)+s(816)]-[s(810)+s(812)]$$

The notation using a small s in sx, and a capital S in Sy illustrates an exemplary arrangement where the first spring constant K1 of the first spring structure of the first structural part 700 has been adjusted to be considerably smaller than the second spring constant K2, thereby providing differently adjusted ranges for sensing in the horizontal and vertical directions. Naturally any of other configuration of spring constants may be applied within the scope.

Similarly, for differential detection, the total output signal Sx in the horizontal direction, and the total output signal sy in the vertical direction from the second structural part 850 may be derived from:

$$Sx=[s(866)+s(864)]-[s(860)+s(862)]$$

$$sy=[s(856)+s(858)]-[s(852)+s(854)]$$

Figure 9:
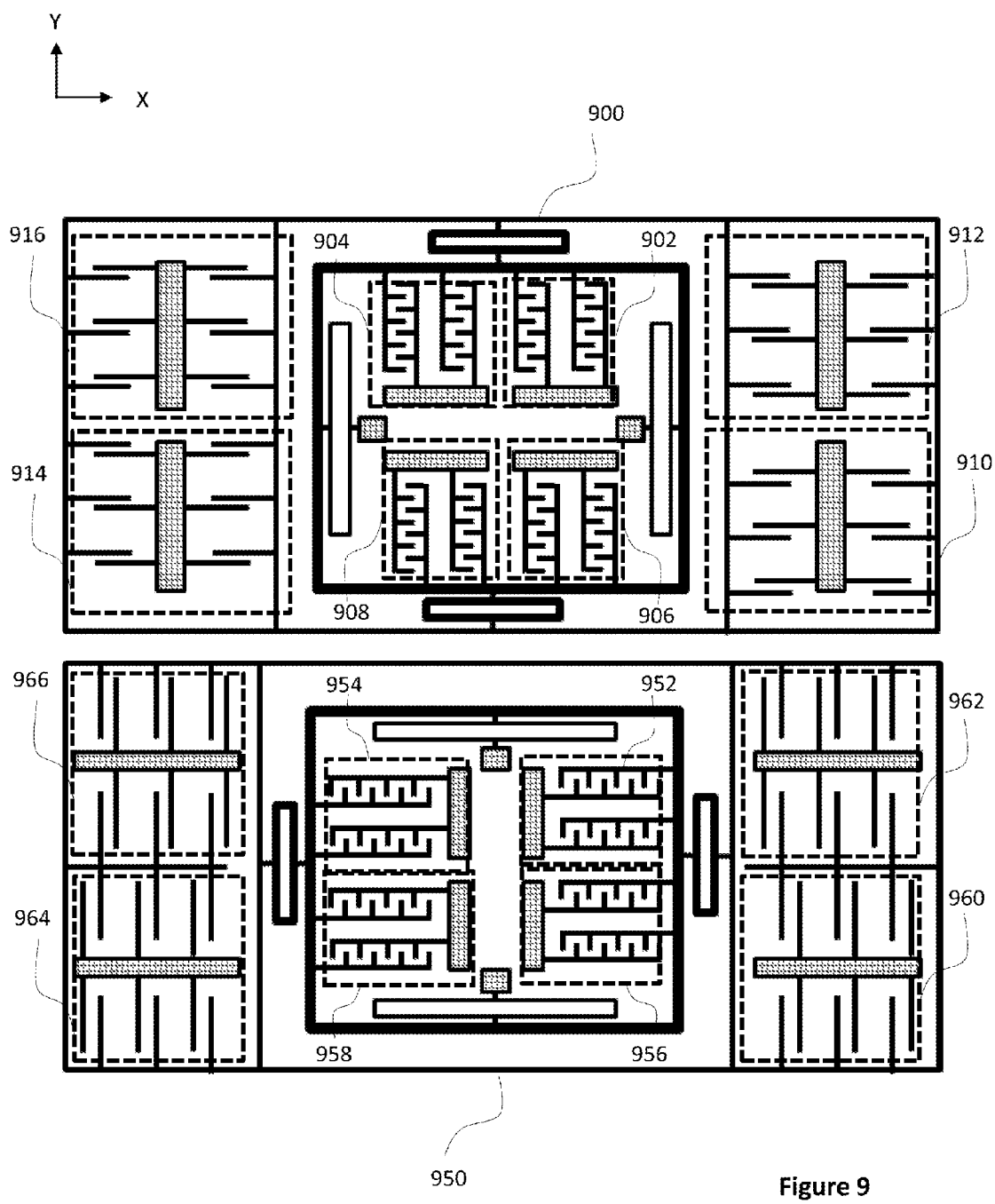
FIG. 9 illustrates an alternative embodiment for double differential detection in the horizontal direction and in the vertical direction.

FIG. 9 illustrates a further embodiment applicable for the above mentioned double differential detection, both in the horizontal direction and in the vertical direction. A first structural part 900 includes the microelectromechanical structure of FIG. 6, and a second structural part 950 includes the microelectromechanical structure with the orientation of FIG. 7, but with an alternative configuration of the secondary detection elements. Accordingly, for differential detection, the total output signal sx in the horizontal direction, and the total output signal Sy in the vertical direction from the first structural part 800 may now be derived from:

$$sx=[s(902)+s(904)]-[s(906)+s(908)]$$

$$Sy=[s(910)+s(916)]-[s(912)+s(914)]$$

Similarly, for differential detection, the total output signal Sx in the horizontal direction, and the total output signal sy in the vertical direction from the second structural part 950 may be derived from:

$$Sx=[s(966)+s(960)]-[s(962)+s(964)]$$

$$sy=[s(954)+s(958)]-[s(952)+s(956)]$$

Figure 10:
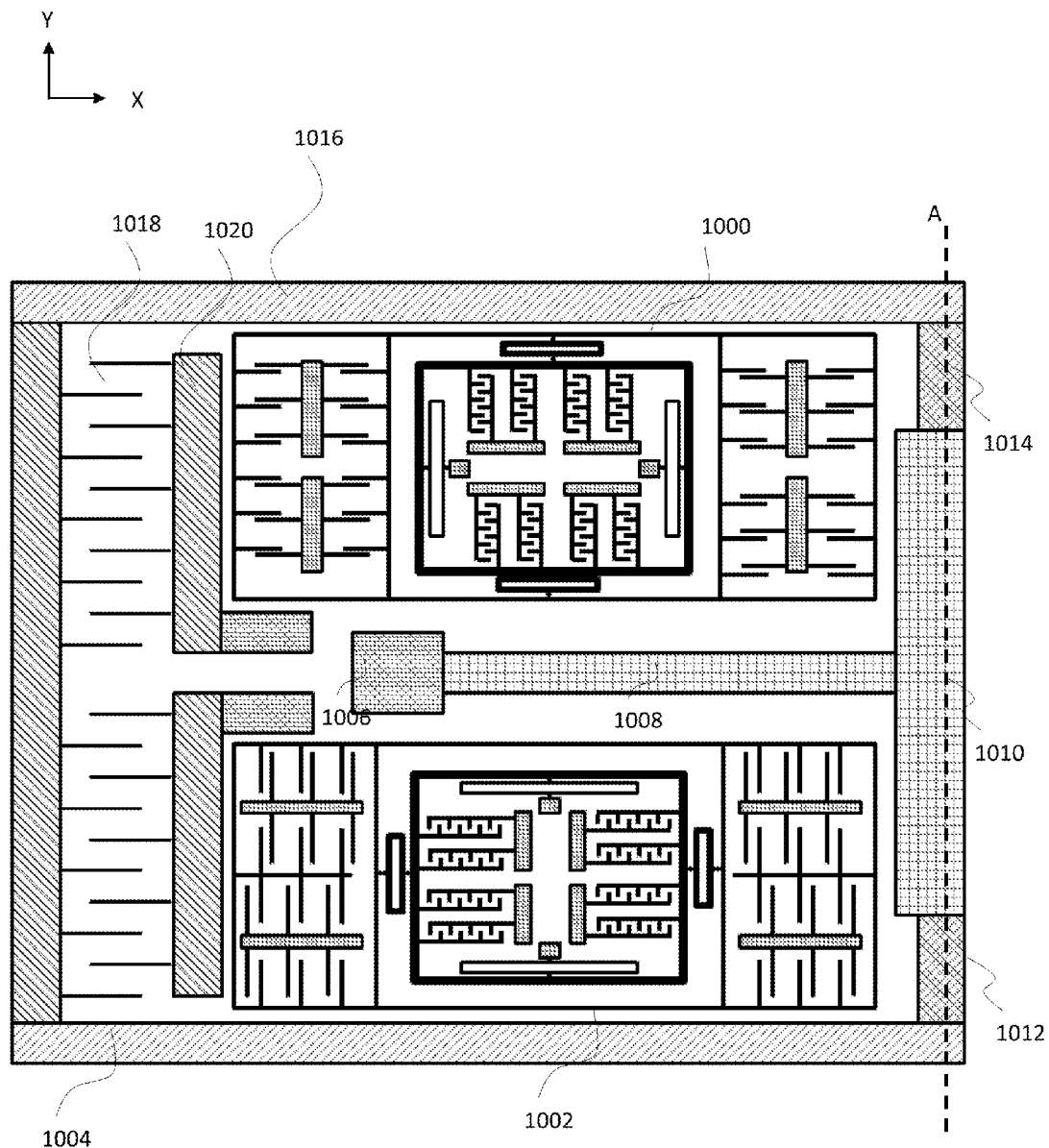
FIG. 10 illustrates an embodiment with a further capability to sense displacements in the out-of-plane direction.

FIG. 10 illustrates an exemplary microelectromechanical structure, in which the configuration of FIG. 9 with two in-plane sensing structural parts 1000 and 1002 are combined with a further structural part 1004 capable of sensing displacements in the out-of-plane direction. As described with the earlier embodiments, each of the in-plane sensing structural parts 1000, 1002 may be arranged to sense displacements of an inertial rotor mass in two in-plane directions, and the comb structures may be arranged to provide differential detection, or double-differential detection. In one or each of the structural parts 1000, 1002, the first and second spring constants may be adjusted to provide same, different, or even significantly different detection ranges for the in-plane detection. The first in-plane sensing structural part 1000 and the second in-plane sensing structural part 1002 may be arranged to have at least one common sensing direction. In the exemplary configuration of FIG. 10, the first structural part 1000 and the second structural part 1002 are positioned side by side such that they have a common horizontal sensing direction X and a common vertical sensing direction Y.

In addition, the further third structural part 1004 is interleaved between the first structural part 1000 and the second structural part 1002 such that an anchor 906 of the third structural part 1004 is positioned between the first structural part 1000 and the second structural part 1002. From the anchor, along one of the common sensing directions and beyond the extent of the first and second structural parts 1000, 1002 extends a rigid first bar 1008 that couples rigidly to a rigid second bar 1010 that is perpendicular to the first bar 1008. The first bar and the second bar form a T-shaped element. From both ends of the second bar extend torsional springs 1012, 1014 that couple the static T-shaped element to a suspended U-shaped mass 1016 that partly circumscribes the in-plane sensing first and second structural parts 1000, 1002. Due to the torsional springs 1012, 1014, motion of the microelectromechanical accelerometer device in the out-of-plane direction causes the inertial mass of the U-shaped element to displace in a rotational motion around an axis A passing through the aligned torsion axes of the torsional springs 1012, 1014. One or more detection elements 1018 may be arranged to detect displacements of the U-shaped element in the out-of-plane direction. In the exemplary configuration of FIG. 10, the out-of-plane detection is implemented with comb structures, where comb fingers moving with the U-shaped element form capacitor plates in the out-of-plane direction Z. These rotor comb fingers interleave with similarly directed capacitor plates of stator comb fingers in an anchored stator structure 1020, such that overlap area between the rotor plates and the stator plates vary according to the out-of-plane motion of the U-shaped rotor mass.

The specific configuration allows the anchor 1006 of the out-of-plane sensing structural element to be positioned close to its stator structure 1020. This greatly reduces errors caused by potential deformations in the support structures. On the other hand, the configuration at the same time positions the detection elements 1018 far away from the rotation axis A, thereby enabling larger movement and thus larger signal from the detection element 1018. In combination, the configuration allows provision of a plurality of detection directions and ranges in a very compact structural area.

Figure 11:
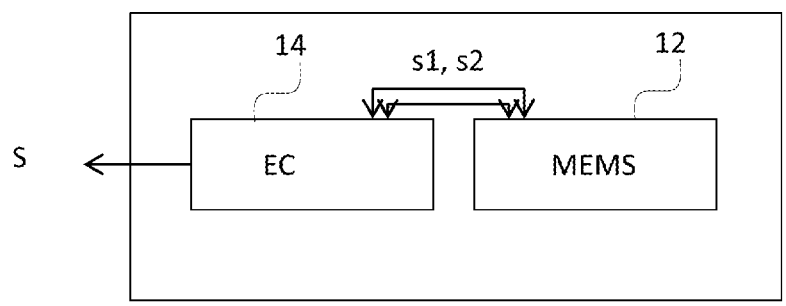
FIG. 11 illustrates elements of a microelectromechanical accelerometer device.

FIG. 11 illustrates elements of a microelectromechanical accelerometer device 10. The accelerometer device 10 comprises a microelectromechanical part 12 including any of the microelectromechanical layer structures described earlier. The accelerometer device may include also an electrical circuit part 14 that is connected to input electrical signals from the microelectromechanical part 12 and output electrical signals to it. The microelectromechanical accelerometer device may be included in a combined sensor element that includes a variety of sensor elements, a wired or mobile computing, gaming or communication device, a measurement device, a rendering device, or a vehicle function control unit, to name a few.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A microelectromechanical structure for measuring accelerations, which microelectromechanical structure comprises:
   a rotor mass including a first frame and a second frame, the second frame circumscribing the first frame;
   a first spring structure for suspending the first frame into a neutral position from a support plane, wherein the first spring structure responds to displacements of the first frame from the neutral position along a first in-plane direction with stiffness of a first spring constant, and eliminates displacements of the first frame along directions other than the first direction;
   a primary detection structure for detection of displacements of the rotor mass from the neutral position along the first direction;
   a second spring structure for suspending the second frame into a neutral position from the first frame, wherein the second spring structure responds to displacements of the second frame from the neutral position along a second direction with stiffness of a second spring constant, and eliminates displacements of the second frame from the first frame along other directions than the second direction, the second direction being perpendicular to the first direction and the second spring constant being at least 50 times the first spring constant;
   a secondary detection structure for detection of displacements of the second frame, a signal of the secondary detection structure including a first signal component responsive to displacements of the second frame along the first direction and a second signal component responsive to displacements of the second frame along the second direction;
   the secondary detection structure includes at least one secondary detection element in which a pair of secondary sensing elements are positioned such that a displacement of the second frame along the first direction increases contribution of one secondary sensing element of the pair of secondary sensing elements to the first signal component, and decreases equally contribution of the other secondary sensing element of the pair of secondary sensing elements to the first signal component, the contribution of the one secondary sensing element of the pair of secondary sensing elements to the first signal component, and the contribution of the other secondary sensing element of the pair of secondary sensing elements to the first signal component thereby cancelling each other.

2. The microelectromechanical structure of claim 1, wherein
   the primary detection structure includes at least one primary detection element;
   the primary detection element includes one or more primary sensing elements, each comprising a primary rotor comb coupled to move with the first frame, and an anchored primary stator comb capacitively connected to the primary rotor comb.

3. The microelectromechanical structure of claim 2, wherein
   the primary rotor comb includes primary rotor comb fingers that extend towards the capacitively connected stator comb in the first direction;
   the primary stator comb includes primary stator comb fingers that extend towards the capacitively connected primary rotor comb in the first direction;
   the primary rotor comb fingers and the primary stator comb fingers are interdigitated such that the capacitance of the primary sensing element changes according to the movement of the first frame along the first direction.

4. The microelectromechanical structure of claim 3, wherein
   the primary detection structure includes at least one pair of primary detection elements positioned for differential detection, wherein a movement of the first frame along the first direction simultaneously increases capacitance in one primary detection element of the pair of primary detection elements, and decreases capacitance in the other primary detection element of the pair of primary detection elements;
   a differential output signal of the primary detection structure is derived from difference of capacitances of the pair of primary detection elements.

5. The microelectromechanical structure of claim 4, wherein
   the first detection structure includes two pairs of primary detection elements positioned for double differential detection, wherein a movement of the first frame along the first direction simultaneously increases capacitance in a first pair of primary sensing elements, and decreases capacitance in a second pair primary sensing elements;

a differential output signal of the primary detection structure is derived from difference between summed capacitances of the first pair of primary detection elements and summed capacitances of the second pair of primary detection elements.

6. The microelectromechanical structure of claim 1, wherein the secondary detection element includes an anchored secondary stator comb with comb fingers extending in two opposite directions, and a secondary rotor comb with comb fingers extending from the second frame towards the stator comb.

7. The microelectromechanical structure of claim 6, wherein the secondary stator comb includes a secondary stator comb body that extends along the second direction, and two sets of secondary stator comb fingers that extend in opposite directions along the first direction;

the secondary rotor comb includes a first set of secondary rotor comb fingers and a second set of secondary rotor comb fingers, the first and second sets of secondary rotor comb fingers mechanically coupled to the second frame to maintain a mutual orientation and to move along the movements of the second frame;

the first set of secondary rotor comb fingers and a first set of secondary stator comb fingers form a first secondary sensing element of the secondary detection element;

and the second set of secondary rotor comb fingers and the second set of secondary stator comb fingers form a second secondary sensing element of the secondary detection element.

8. The microelectromechanical structure of claim 1, further comprising a pair of second detection elements positioned for differential detection, wherein positioned for differential detection, wherein a movement of the second frame along the second direction simultaneously increases capacitance in one secondary detection element of the pair of secondary detection elements, and decreases capacitance in the other secondary detection element of the pair of secondary detection elements; and a differential output signal of the secondary detection structure is derived from difference of capacitances of the pair of secondary detection elements.

9. The microelectromechanical structure of claim 8, further comprising two pairs of secondary detection elements positioned for parallel double differential detection in the first direction, wherein capacitances of a pair of secondary detection elements in one side of the first frame are subtracted from capacitances a pair of secondary detection elements in the opposite side of the first frame in the first direction.

10. The microelectromechanical structure of claim 8, further comprising two pairs of secondary detection elements positioned for parallel double differential detection in the second direction, wherein capacitances of a pair of secondary detection elements that are in opposite sides of the first frame and parallel in the first direction are subtracted from capacitances of a pair of secondary detection elements that are in opposite sides of the first frame and parallel in the first direction.

11. The microelectromechanical structure of claim 8, further comprising two pairs of second detection elements positioned for cross-coupled double differential detection, wherein capacitances of a pair of secondary detection elements that are in a first cross-wise position in opposite sides of the first frame are subtracted from signals from capacitances of another pair of secondary detection elements that are in a second cross-wise position in opposite sides of the first frame.

12. A microelectromechanical accelerometer device including at least one microelectromechanical structure according to claim 1.

13. A microelectromechanical accelerometer device of claim 12, including two microelectromechanical structures, wherein a first microelectromechanical structure part is oriented to detect displacements of the first frame from the neutral position along the first direction, and a second microelectromechanical structure part is oriented to detect displacements of the first frame from the neutral position along the first direction.

14. A microelectromechanical accelerometer device of claim 13, further comprising a third microelectromechanical structure capable of sensing displacements in the out-of-plane direction.

15. A microelectromechanical accelerometer device of claim 14, wherein the third microelectromechanical structure is interleaved between the first microelectromechanical structure and the second microelectromechanical structure such that an anchor of the third microelectromechanical structure is positioned between the first structural part and the second structural part.

16. A microelectromechanical accelerometer device of claim 15, wherein a rigid first bar extends from the anchor along the first or the second direction and beyond the extent of the first and second microelectromechanical structures;

the rigid first bar couples rigidly to a rigid second bar that is perpendicular to the first bar, the first bar and the second bar forming a T-shaped element;

torsional springs that extend from both ends of the second bar to couple the T-shaped element to a suspended U-shaped mass that partly circumscribes first and second microelectromechanical structure;

one or more detection elements arranged to detect displacements of the U-shaped element in the out-of-plane direction.

* * * * *